Patented May 18, 1937

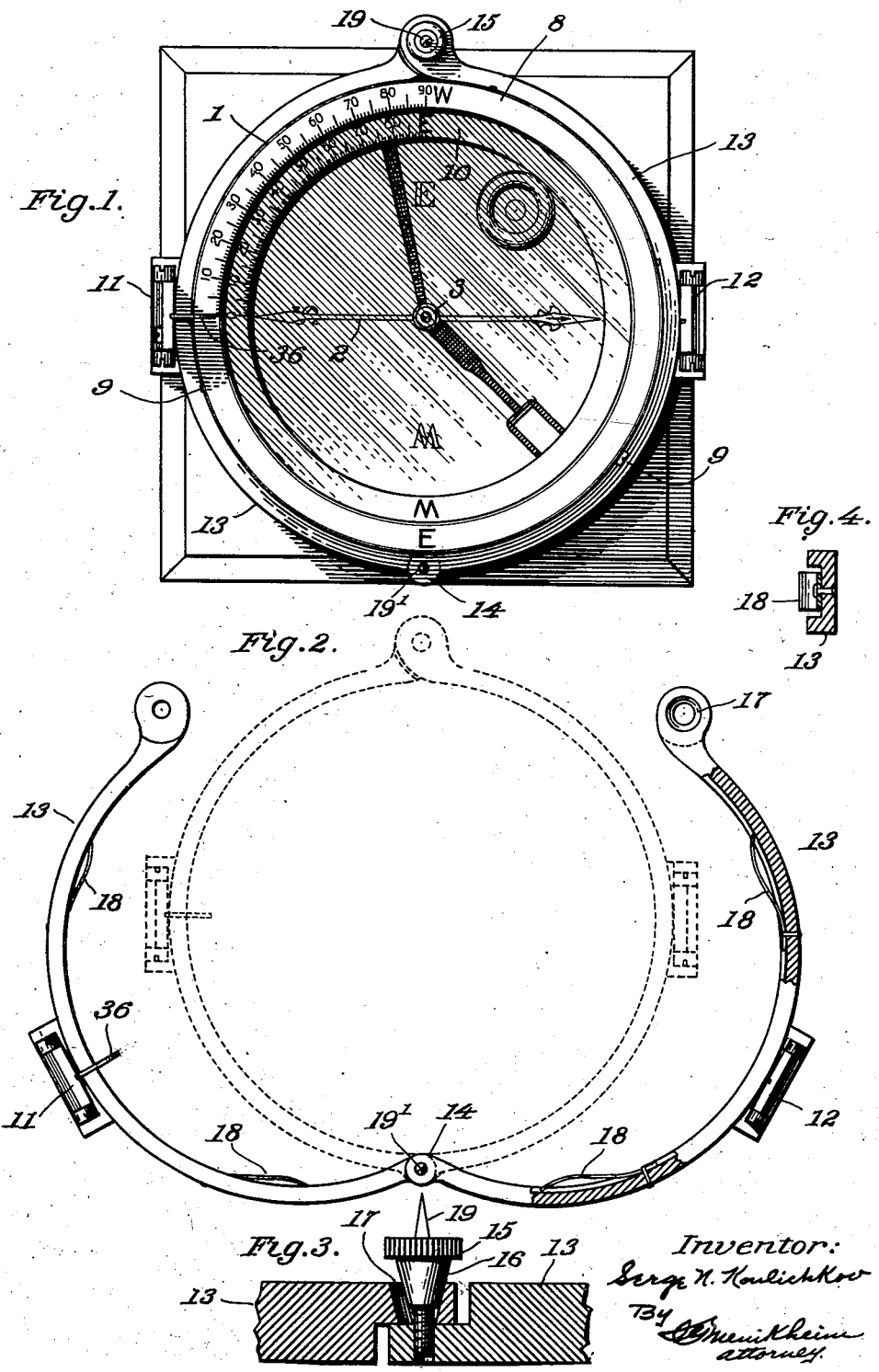

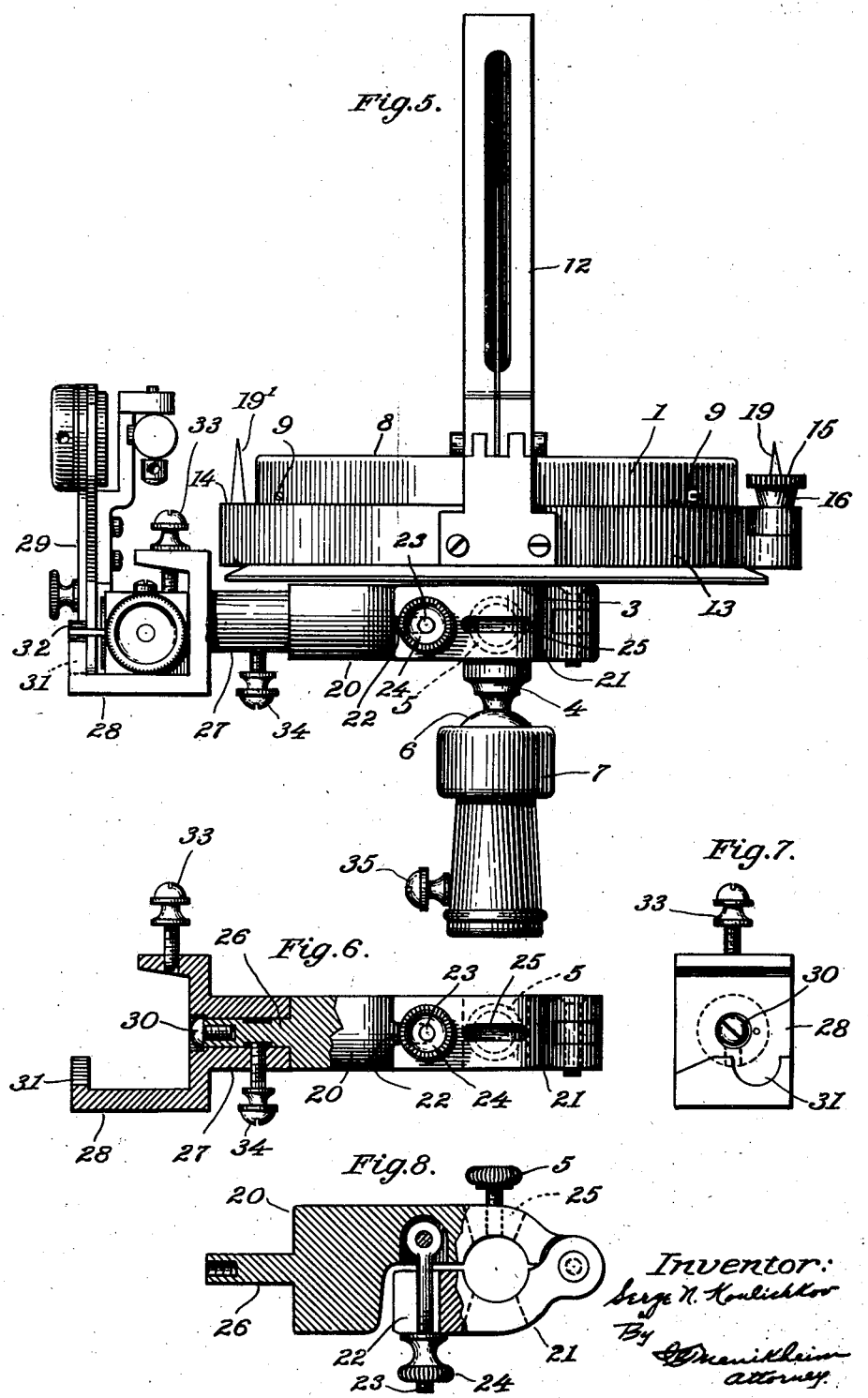

2,080,776

UNITED STATES PATENT OFFICE 2,080,776

SURVEYOR'S COMPASS

Serge N. Koulichkov, New York, N. Y.

Application October 20, 1936, Serial No. 106,542

5 Claims. (Cl. 33—72)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

My invention relates to surveying compasses and has particular reference to compasses or instruments for surveying in horizontal and vertical planes.

As is well known, in field surveying with a compass, when running a closed traverse, it is seldom possible to close the traverse with an angular error within allowable limits, because the measurement of angles by a magnetic needle is accompanied by more or less large systematic errors. These errors are caused by magnetic variations due to: local attractions of the magnetic needle from the magnetic meridian, partly by daily deviations, (solar-diurnal variation), by the effect of static electricity under the glass cover of the compass housing, by the loss of magnetism of the needle (sluggish needle), wear of the pivot point under the needle, also a number of other accidental causes, such as nearness of metal articles (axes, steel tape, chaining pins, tobacco cans, water pipe, high voltage transmission lines, etc.). For the same reason it is often impossible to obtain satisfactory results when a magnetic compass is used for running a line on a certain bearing. Besides, the work with a compass requires extreme accuracy on the part of the surveyor, with an unavoidable loss of time while waiting for the cessation of the needle oscillations.

In order to overcome the above difficulties connected with the use of a magnetic compass, I devised an arrangement for direct measurement of angles without the use of a magnetic needle, which can be used only at the beginning of the surveying for orientation of the traverse. For this purpose I provide a special compass in which the sight vanes are not connected rigidly with the compass housing, but are mounted on a separate ring which can be turned around on the housing and provided with a pointer for reading the angles on the upper compass scale; I also provide an arrangement for supporting an Abney level on the compass socket in order to simultaneously conduct surveying in a vertical plane, especially in connection with my specially calibrated surveyors' rods, forming a subject of a separate patent application (Serial No. 37,929, filed August 26, 1935).

My invention is more fully described in the accompanying specification and drawings in which—

Figure 1 is a top plan view of my compass;

Figure 2 is a detail view of a sight ring in an open position;

Figure 3 is a detail view of a clamping screw for the ring;

Figure 4 is a sectional view of the ring;

Figure 5 is an elevation of my compass with the Abney level;

Figure 6 is a detail view of a clamp for the Abney level;

Figure 7 is an end view of the clamp; and,

Figure 8 is another view of the clamp.

Similar numerals refer to similar parts throughout the several views.

My compass consists of a housing 1 for a magnetic needle 2 supported on a tubular stem 3 which fits over the end of a stem 4 and can be turned around on the stem in horizontal plane. A thumb screw 5 is used for clamping the compass in any desired position on the stem. The stem has a ball 6 fitted in a tripod socket 7, which may be tightened to the tripod by an introduced set screw 35.

An upper or movable scale 8 of the compass is tightened by screws 9 so as to exactly correspond to the lower scale 10, but having the E and W points not interchanged. I prefer to use for my arrangement a standard United States Forest Service compass, with changes and additions as will be described.

Standard sight vanes 11 and 12 in my device are mounted on a separate ring 13 consisting of two halves joined at one end by a hinge 14 and having a tightening and locking screw 15 at the other end. The screw 15 is screwed into the lower portion of one-half of the ring, and has a tapering upper portion 16 passing through a correspondingly tapered enlarged hole 17 in the upper or overlapping end of the other half of the ring. By tightening the screw its tapered portion draws the halves of the ring together thereby tightening the ring on the compass housing. By turning the screw back the ring may be loosened sufficiently to permit its turning around the housing. The heads of the screws 9 retain the ring in its place on the housing. The ring is channeled on the inside as shown in Figure 4, and flat springs 18 are fastened inside. These springs provide the necessary friction for the ring when it is being turned around so as to prevent its accidental slipping from a given position while taking the measurements of the angles. The pivot at the ring hinge and the tightening screw 15 have sharp index points 19 which serve as supplementary sights in order to lay off the right angles to the readings taken through the main sight vanes 11 and 12, the latter being located at right angles to the supplementary sights. A thin pointer 36 attached to one of the sight vanes (with a hair) extends over the upper compass scale and is used for taking angle readings. The pointer fits into a corresponding slot in the sight vane when the latter is folded.

A bracket 20 is mounted under the compass on the tubular stem 3. The bracket has a hinged clamp 21 with a slot 22 on the end fitting over a screw 23 and tightened by a nut 24. The screw is pivoted on the other end so that it does not need to be entirely removed when the clamp is turned out on its hinge for removing or replacing the bracket on the stem. The bracket and the clamp have elongated slots 25 for the screw 5 so that the bracket can be placed in various positions without interfering with the screw 5.

The bracket 20 has an extension 26 on which turns a sleeve 27 of a clamp 28 for an Abney level 29. The extension has a screw 30 in the end retaining the clamp 28 by its head which rests in a corresponding recess in the clamp. The clamp has a groove 31 for a screw 32 of the Abney level and a screw 33 for clamping the Abney level in position. A clamping thumb screw 34 is used for setting the clamp with the Abney level in any desired position.

The operation of my device is as follows:

The movable or upper compass scale is set against the lower scale, or shifted as required for correction of the local declination, and tightened by a side screw 9. The pointer 36 (or the line of sight) must be coincided with the point of the stationary pin inside of the compass housing against the mark N. The sight vanes 11 and 12 are then placed against a base line by rotating the compass box about its vertical axis, and the reading of the magnetic needle is noted (to orient the traverse to the magnetic meridian). From then on the needle is not used for further surveying. Without disturbing the compass frame 1 the ring 13 is turned directing the sight vanes against the next point on the traverse, and the angle is noted on the upper compass scale. The instrument is then moved to the next point and the ring is set so as to obtain the reverse bearing to the preceding point, the sight vanes being turned with the compass frame backward to the starting point. Then the angular reading to the next point is taken and these operations are continued until the traverse is closed.

Additional sights 19 may be used for taking readings at right angles to the direction in which the main sight vanes are set.

The Abney level, being held in a bracket, can give much more accurate readings than when held in the hands. In connection with my surveyor's rod it can be used for accurate leveling and for various surveying measurements as described in my above mentioned patent application.

My device has the following important advantages:

1. It eliminates all the errors connected with the use of a magnetic needle, and therefore allows more accurate surveys.
2. Affords considerable saving in time as it is not necessary to wait every time for the needle oscillations to stop.
3. The operations and computations are simplified due to the direct reading of the angles.
4. The layout of right angles to the given bearings are simplified and expedited.
5. The magnetic compass serves a much longer time.
6. Elevations are rapidly and accurately determined because of the stability of the mounting for the Abney level.
7. The Abney level can be used as a level for an accurate leveling with the use of my surveyor's rod or an ordinary leveling rod.
8. The Abney level (its aperture) can be used for determination of distances by indirect method using my surveyor's rod.

My device therefore can be used for various surveying operations eliminating the necessity of using a transit.

Having thus described my invention, what I claim for Letters Patent is:

1. In a surveying compass, the combination of a magnetic compass having a circular housing with stationary and movable scales and a stem base for mounting on a tripod, a ring rotatively mounted on the housing, sight vanes on opposite sides of the ring and attached thereto, a bracket removably mounted on the base, and means adapted to rotatively support a level on said bracket.

2. In a surveying compass, the combination of a magnetic compass having a circular housing with stationary and movable scales and a stem base for mounting on a tripod, a ring rotatively supported on the housing, sight vanes mounted on opposite sides of the ring, means to clamp the ring on the housing, and a pointer extending from one of the sight vanes to the movable scale on the compass.

3. In a surveyor's compass, the combination of a magnetic compass having a stem base for mounting on a tripod, a bracket removably mounted on said base and extending transversely thereto, a clamp rotatively mounted on the end of said bracket, means to tighten the clamp on the end of the bracket, and means adapted to removably fasten a level in the clamp.

4. In a surveying compass, the combination of a magnetic compass having a stem base for mounting on a tripod and a circular housing with a stationary and movable scale, a ring rotatively mounted on the housing and consisting of two halves hingedly connected together, means to draw the ring halves together thereby tightening it on the housing, sight vanes mounted on opposite sides of the ring, and a pointer extending from one of the sight vanes to the upper movable scale on said compass.

5. A surveying compass as set forth in claim 2, characterized by resilient frictional means interposed between said ring and said housing.

SERGE N. KOULICHKOV.